US009647561B2

(12) United States Patent
Yang et al.

(10) Patent No.: US 9,647,561 B2
(45) Date of Patent: May 9, 2017

(54) PROGRAMMABLE CURRENT LIMIT CIRCUIT FOR A PROGRAMMABLE POWER SUPPLY

(71) Applicant: SYSTEM GENERAL CORPORATION, New Taipei (TW)

(72) Inventors: Ta-Yung Yang, Milpitas, CA (US); Chen-Hua Chiu, New Taipei (TW); Chien-Yuan Lin, New Taipei (TW); Jung-Sheng Chen, Kaohsiung (TW); Yuan-Pu Lee, Hsinchu (TW)

(73) Assignee: FAIRCHILD (TAIWAN) CORPORATION, Taipei (TW)

( * ) Notice: Subject to any disclaimer, the term of this patent is extended or adjusted under 35 U.S.C. 154(b) by 242 days.

(21) Appl. No.: 14/510,445

(22) Filed: Oct. 9, 2014

(65) Prior Publication Data

US 2015/0115919 A1 Apr. 30, 2015

Related U.S. Application Data

(60) Provisional application No. 61/896,243, filed on Oct. 28, 2013.

(51) Int. Cl.

*H02M 1/32* (2007.01)
*H02M 3/335* (2006.01)
*H02M 1/36* (2007.01)
*H02M 1/00* (2006.01)

(52) U.S. Cl.

CPC ......... *H02M 3/33507* (2013.01); *H02M 1/32* (2013.01); *H02M 1/36* (2013.01); *H02M 2001/0025* (2013.01)

(58) Field of Classification Search

CPC ............ H02M 1/08; H02M 1/32; H02M 1/36; H02M 3/33507; H02M 2001/0025

See application file for complete search history.

(56) References Cited

U.S. PATENT DOCUMENTS

| | | | | |
|---|---|---|---|---|
| 4,688,158 A * | 8/1987 | Peterson | H02M 3/33507 363/21.18 |
| 5,896,279 A * | 4/1999 | Lin | H02M 3/33569 363/21.11 |
| 6,344,983 B1 * | 2/2002 | Glennon | H02M 3/33507 363/21.01 |
| 6,611,439 B1 | 8/2003 | Yang et al. | |
| 6,674,656 B1 | 1/2004 | Yang et al. | |
| 6,721,192 B1 | 4/2004 | Yang et al. | |
| 7,054,170 B2 | 5/2006 | Yang et al. | |
| 7,239,532 B1 * | 7/2007 | Hsu | H02M 3/33523 363/21.12 |
| 7,349,229 B1 | 3/2008 | Yang | |

(Continued)

*Primary Examiner* — Matthew Nguyen

(74) *Attorney, Agent, or Firm* — McClure, Qualey & Rodack, LLP

(57) ABSTRACT

A control circuit of a power supply is provided. The control circuit includes a circuit and a PWM circuit. The circuit generates a limit signal in response to an output voltage of the power supply for limiting a switching current of a transformer of the power supply. The PWM circuit generates a switching signal in response to a feedback signal and the limit signal for switching the transformer and regulating the output voltage of the power supply. A level of the feedback signal is related to a level of the output voltage of the power supply. The output voltage of the power supply is programmable.

12 Claims, 5 Drawing Sheets

(56) References Cited

U.S. PATENT DOCUMENTS

| | | | | |
|---|---|---|---|---|
| 7,486,528 | B2 | 2/2009 | Yang | |
| 7,635,956 | B2 * | 12/2009 | Huynh | H02M 3/33523 315/209 R |
| 7,671,578 | B2 | 3/2010 | Li et al. | |

* cited by examiner

PROGRAMMABLE CURRENT LIMIT CIRCUIT FOR A PROGRAMMABLE POWER SUPPLY

CROSS REFERENCE TO RELATED APPLICATIONS

This application claims the benefit of U.S. Provisional Application No. 61/896,243, filed on Oct. 28, 2013, the contents of which are incorporated herein by reference.

BACKGROUND OF THE INVENTION

Field of the Invention

The invention relates to a programmable current limit for a power supply, and more particular to a power supply with a programmable output voltage (variable output voltage).

Description of the Related Art

Technique of current limits is utilized to meet safety requirements. The detail skill of current limits for a power supply can be found in the prior arts of U.S. Pat. No. 6,611,439 titled "PWM controller for controlling output power limit of a power supply", U.S. Pat. No. 6,674,656 titled "PWM controller having a saw-limiter for output power limit without sensing input voltage", U.S. Pat. No. 6,721,192 titled "PWM controller regulating output voltage and output current in primary side", and U.S. Pat. No. 7,054,170 titled "Power-mode controlled power converter".

BRIEF SUMMARY OF THE INVENTION

An exemplary embodiment of a control circuit of a power supply is provided. The control circuit comprises a circuit and a PWM circuit. The circuit generates a limit signal in response to an output voltage of the power supply for limiting a switching current of a transformer of the power supply. The PWM circuit generates a switching signal in response to a feedback signal and the limit signal for switching the transformer and regulating the output voltage of the power supply. A level of the feedback signal is related to a level of the output voltage of the power supply. The output voltage of the power supply is programmable.

An exemplary embodiment of a method of generating an output voltage of a power supply is provided. The method comprises the steps of generating a limit signal in response to an output voltage of the power supply for limiting a switching current of a transformer of the power supply; and generating a switching signal in response to a feedback signal and the limit signal for switching the transformer and regulating the output voltage of the power supply. A level of the feedback signal is related to the level of the output voltage of the power supply. The output voltage of the power supply is programmable.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
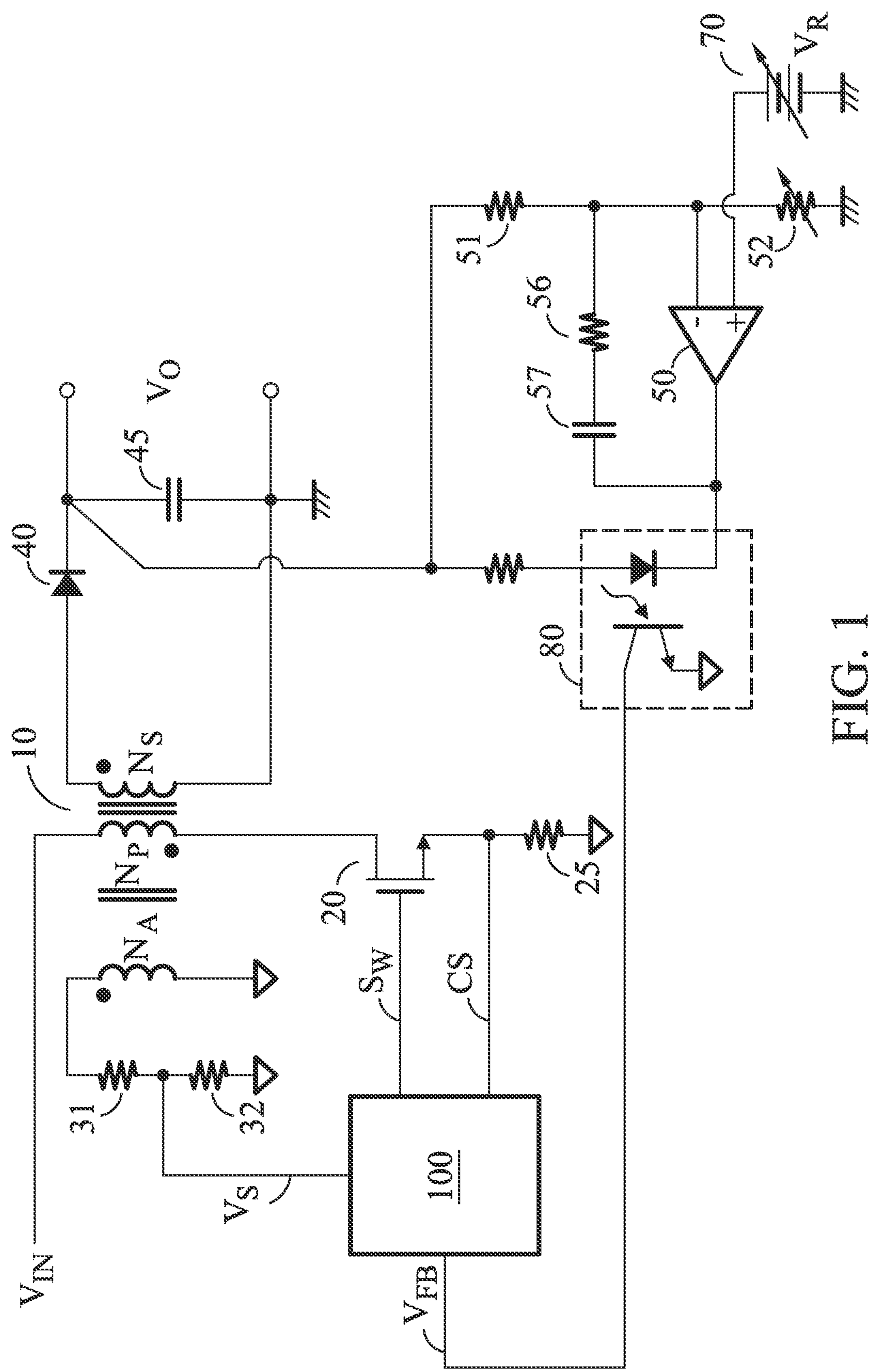
FIG. 1 shows an exemplary embodiment of a power supply in accordance with the present invention.

The following description is of the best-contemplated mode of carrying out the invention. This description is made for the purpose of illustrating the general principles of the invention and should not be taken in a limiting sense. The scope of the invention is best determined FIG. 1 is an exemplary embodiment of a power supply in accordance with the present invention. A transformer 10 is coupled between an input voltage $V_{IN}$ of the power supply and a transistor 20. The transistor 20 is coupled to switch the transformer 10 for transforming a power. The power is related to the input voltage $V_{IN}$. The transformer 10 includes a primary winding $N_P$, a second winding Ns and an auxiliary winding $N_P$. When the transformer 10 is switched, the power is transformed from the primary winding $N_P$ to the second winding Ns, and an output voltage $V_O$ of the power supply is generated. In other words, the secondary winding $N_S$ of the transformer 10 will generate the output voltage $V_O$ through a rectifier 40 and a capacitor 45 when the transformer 10 is switched. A control circuit 100 generates a switching signal $S_W$ coupled to drive the transistor 20 for regulating the output voltage $V_O$ of the power supply. When the transistor 20 is turned on, a switching current of the transformer 10 will generate a switching current signal CS via a resistor 25. The switching current signal CS is coupled to the control circuit 100. Resistors 31 and 32 are coupled to the auxiliary winding $N_A$ of the transformer 10 for detecting a reflected signal $V_S$. The reflected signal $V_S$ is coupled to the control circuit 100. The reflected signal $V_S$ represents a reflected voltage of the transformer 10. The level of the reflected signal $V_S$ is related to the level of the output voltage $V_O$ during the demagnetizing period of the transformer 10. Therefore, an output-voltage signal $E_O$ (shown in FIG. 2) is produced according to the reflected signal $V_S$. In other words, the output-voltage signal $E_O$ is correlated to the level of the output voltage $V_O$ of the power supply.

An error amplifier 50 is coupled to receive the output voltage $V_O$ via resistors 51 and 52. The error amplifier 50 has a reference voltage 70 ($V_R$). The output of the error amplifier 50 generates a feedback signal $V_{FB}$ coupled to the control circuit 100 through an opto-coupler 80. Therefore, the control circuit 100 will generate the switching signal $S_W$ according to the feedback signal $V_{FB}$ to regulate the output voltage $V_O$ as shown in Equation (1).

$$V_O = \frac{R_{51} + R_{52}}{R_{52}} \times V_R \quad (1)$$

The reference voltage 70 ($V_R$) is programmable for determining the output voltage $V_O$ of the power supply. Furthermore, the resistor 52 is adjustable for programming the output voltage $V_O$. A resistor 56 and a capacitor 57 are coupled to the error amplifier 50 for feedback loop compensation. The capacitance of the capacitor 57 will determine the bandwidth of the feedback loop for the regulation of the output voltage $V_O$.

Figure 2:
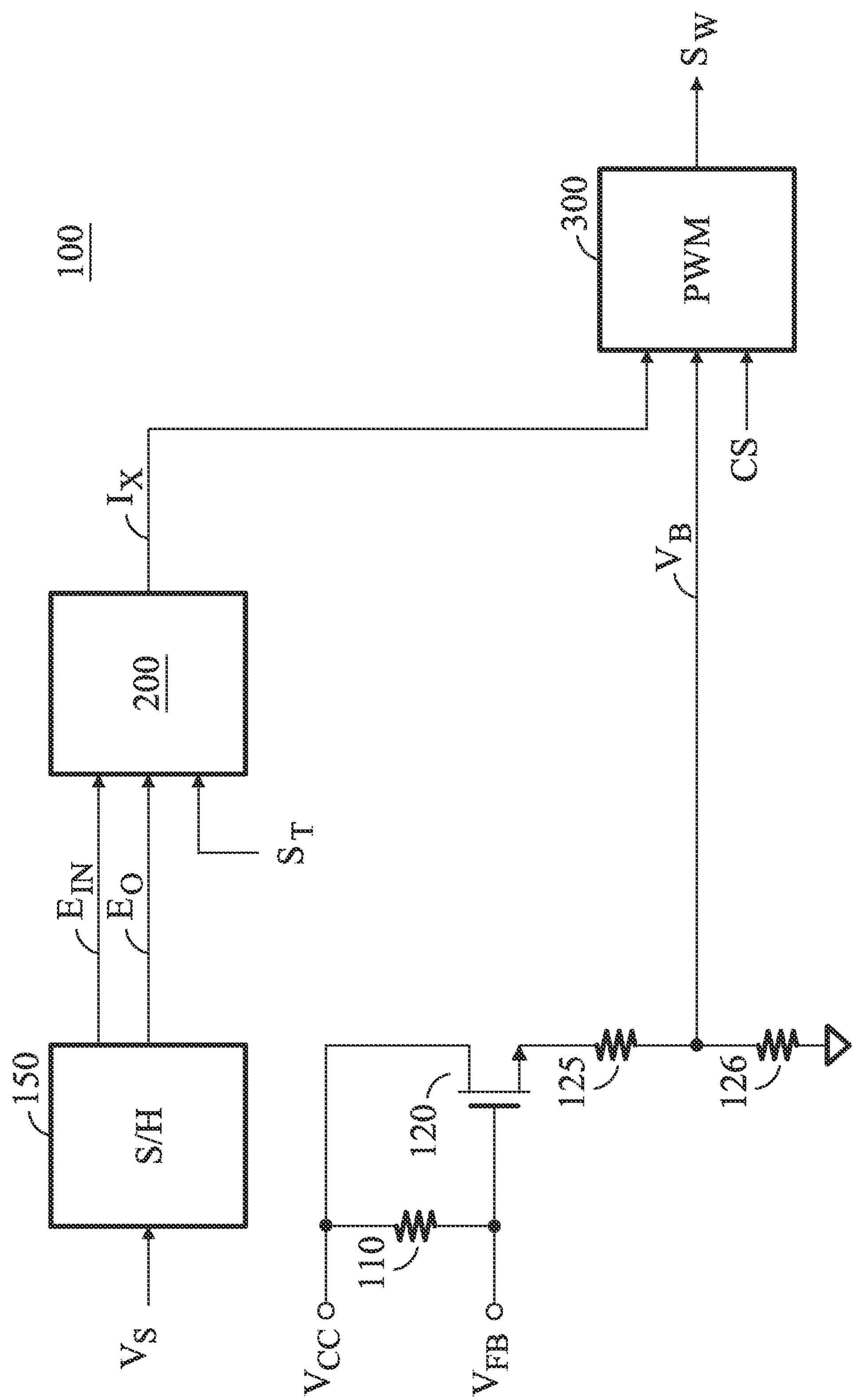
FIG. 2 shows an exemplary embodiment of a control circuit of the power supply in FIG. 1.

FIG. 2 is an exemplary embodiment of the control circuit 100 in accordance with the present invention. In the control circuit 100, a level-shift circuit includes a transistor 120 and resistors 110, 125, and 126. The level-shift circuit is coupled to receive the feedback signal $V_{FB}$ for generating a signal $V_B$. In other words, the level of the signal $V_B$ is related to the level of the feedback signal $V_{FB}$. The signal $V_B$, the switching current signal CS, and a limit signal $I_X$ are coupled to a pulse width modulation circuit (PWM) 300 for generating the switching signal $S_W$. A circuit 200 generates the limit signal $I_X$ in accordance with the output-voltage signal $E_O$, an input-voltage signal $E_{IN}$, and an initial-timing signal $S_T$.

A sample-hold circuit (S/H) 150 receives the reflected signal $V_S$ for generating the output-voltage signal $E_O$ and the input-voltage signal $E_{IN}$. The output-voltage signal $E_O$ is correlated to the output voltage $V_O$. The input-voltage signal $E_{IN}$ represents the input voltage $V_{IN}$. The detail skill of sampling the reflected voltage $V_S$ of the transformer 10 and generating the output-voltage signal $E_O$ can be found in the prior arts of U.S. Pat. No. 7,349,229 titled "Causal sampling circuit for measuring reflected voltage and demagnetizing time of transformer", and U.S. Pat. No. 7,486,528 titled "Linear-predict sampling for measuring demagnetized voltage of transformer". The detail approach for generating the input-voltage signal $E_{IN}$ through the detection of the transformer's voltage can be found in the prior art of U.S. Pat. No. 7,671,578 titled "Detection circuit for sensing the input voltage of transformer".

Figure 3:
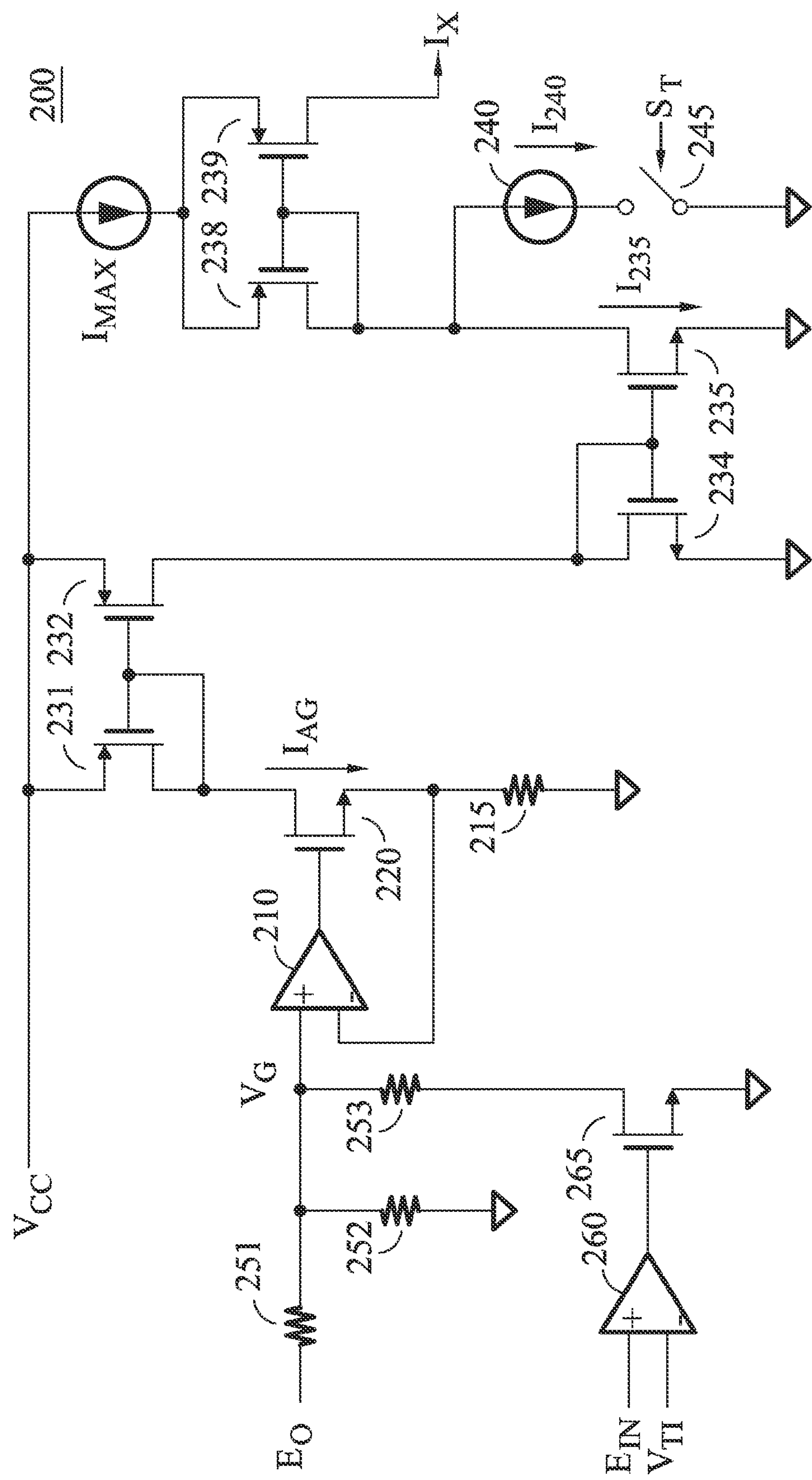
FIG. 3 shows an exemplary embodiment of a circuit of the control circuit in FIG. 2.

FIG. 3 is an exemplary embodiment of the circuit 200 in accordance with the present invention. The output-voltage signal $E_O$ generates a signal $V_G$ through a voltage divider. The voltage divider is formed by resistors 251, 252 and 253. The enabling/disabling of the resistor 253 is controlled by a transistor 265. A comparator 260 will turn on the transistor 265 once the input-voltage signal $E_{IN}$ is higher than a threshold $V_{T1}$. In other words, when the input-voltage signal $E_{IN}$ is higher than the threshold $V_{T1}$, the resistor 253 is enabled; and once the input-voltage signal $E_{IN}$ is lower than the threshold $V_{T1}$, the resistor 253 is disabled. Therefore, when the input-voltage signal $E_{IN}$ is lower than the threshold $V_{T1}$, the signal $V_G$ is shown as, $$V_G = \frac{R_{252}}{R_{251} + R_{252}} \times E_O \tag{2}$$

When the input-voltage signal $E_{IN}$ is higher than the threshold $V_{T1}$, the signal $V_G$ can be expressed as, $$V_G = \frac{R_P}{R_{251} + R_P} \times E_O \tag{3}$$

$$R_P = \frac{R_{252} \times R_{253}}{R_{252} + R_{253}} \tag{4}$$

An amplifier 210, a resistor 215, and a transistor 220 will generate a current $I_{AG}$ according to the signal $V_G$.

$$I_{AG} = \frac{V_G}{R_{215}} \tag{5}$$

$$I_X = (K \times I_{AG}) + (K_0 \times I_{240}) \tag{6}$$

As shown in Equation (6), the limit signal $I_X$ is generated according to the current $I_{AG}$, wherein K and $K_0$ are constant and related to a ratio of current mirrors formed by transistors 231, 232, 234, 235, 238, and 239; $I_{240}$ is a current of a current source 240. The maximum value of the limit signal $I_X$ is clamped by a current source $I_{MAX}$. The current source 240 is enabled by a switch 245. The switch 245 is controlled by the initial-timing signal $S_T$. That is to say the initial-timing signal $S_T$ will enable the current source 240 when the power supply is turned on and during the output voltage $V_O$ is programmed to a higher value. Therefore, the value of the limit signal $I_X$ is determined by the output-voltage signal $E_O$, the input-voltage signal $E_{IN}$, and the initial-timing signal $S_T$. In detailed, When the switch 245 is turned off by the initial-timing signal $S_T$, the mirror composed of the transistors 238 and 239 mirrors only the current $I_{235}$ flowing through the transistor 235 to generate the limit signal $I_X$. When the output voltage rises (that is during the power-on period of the power supply), the switch 245 is turned on by the enabled initial-timing signal $S_T$. At this time, the mirror composed of the transistors 238 and 239 mirrors the currents. The currents sum of the currents $I_{235}$ and $I_{240}$ to generate the limit signal $I_X$. Thus, according to the above description, the level of the limit signal $I_X$ is increased during the power-on period of the power supply.

Figure 4:
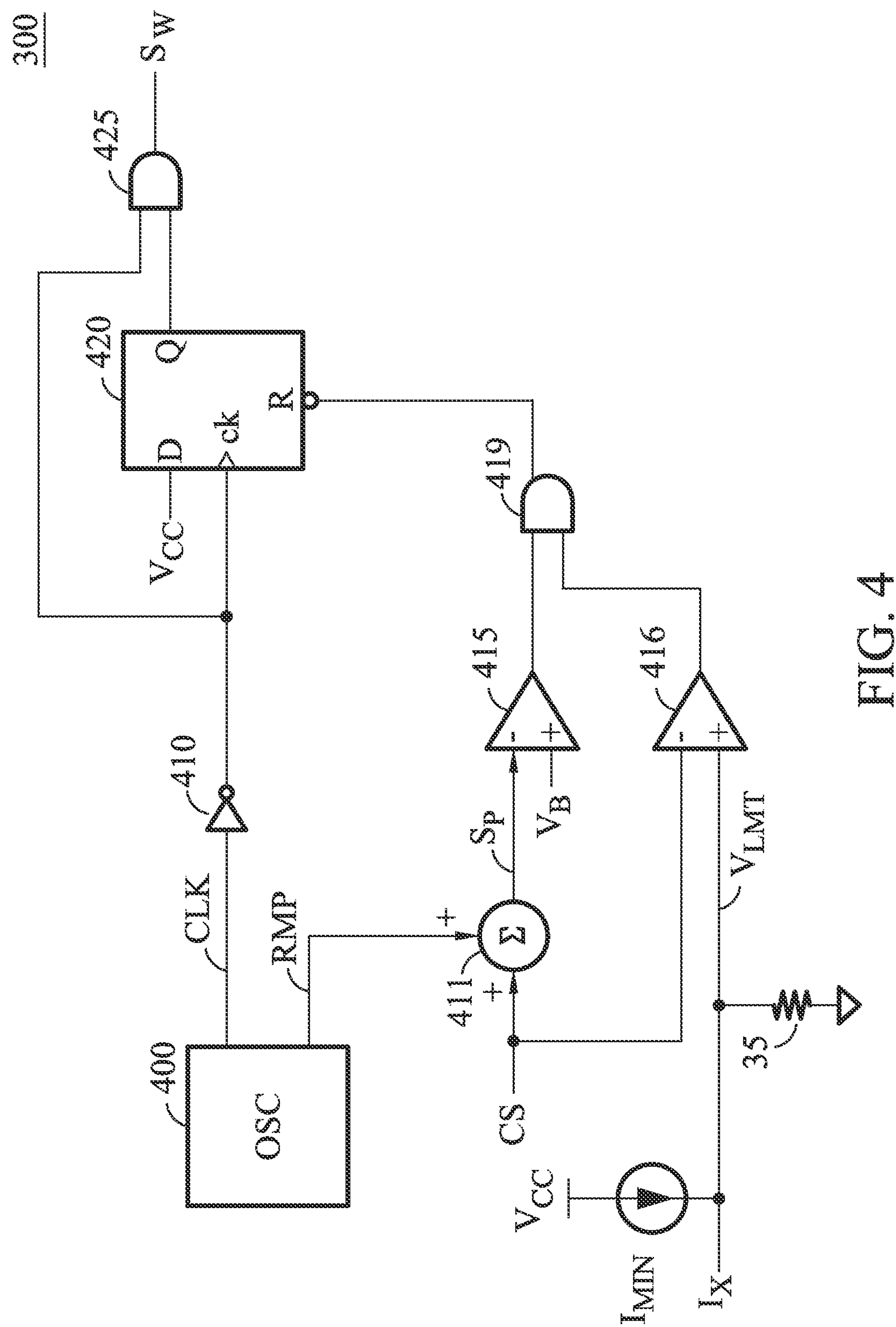
FIG. 4 shows an exemplary embodiment of a PWM circuit of the control circuit in FIG. 2.

FIG. 4 is an exemplary embodiment of the pulse width modulation circuit (PWM) 300 according to the present invention. An oscillator (OSC) 400 will generate a clock signal CLK and a ramp signal RMP. The clock signal CLK is coupled to clock a flip-flop 420 via an inverter 410 for generating the switching signal SW through an AND gate 425. An adder 411 will generate a signal SP in response to the ramp signal RMP and the switching current signal CS. The signal SP is coupled to a comparator 415. The comparator 415 will reset the flip-flop 420 and turn off the switching signal SW via an AND gate 419 when the feedback signal VB is lower than the signal SP. The limit signal IX and a current source IMIN are coupled to a resistor 35 to develop the current-limit signal VLMT. According to the operation of the limit signal IX, the current source IMIN, and the resistor 35 in FIG. 4, the current-limit signal VLMT represents the limit signal IX. In other words, the current-limit signal VLMT is in the direct proportion to the limit signal IX. So that, the current-limit signal VLMT is coupled to limit the switching current of the transformer 10. A comparator 416 is coupled to reset the flip-flop 420 and turn off the switching signal SW via the AND gate 419 when the switching current signal CS is higher than the current-limit signal VLMT.

Figure 5:
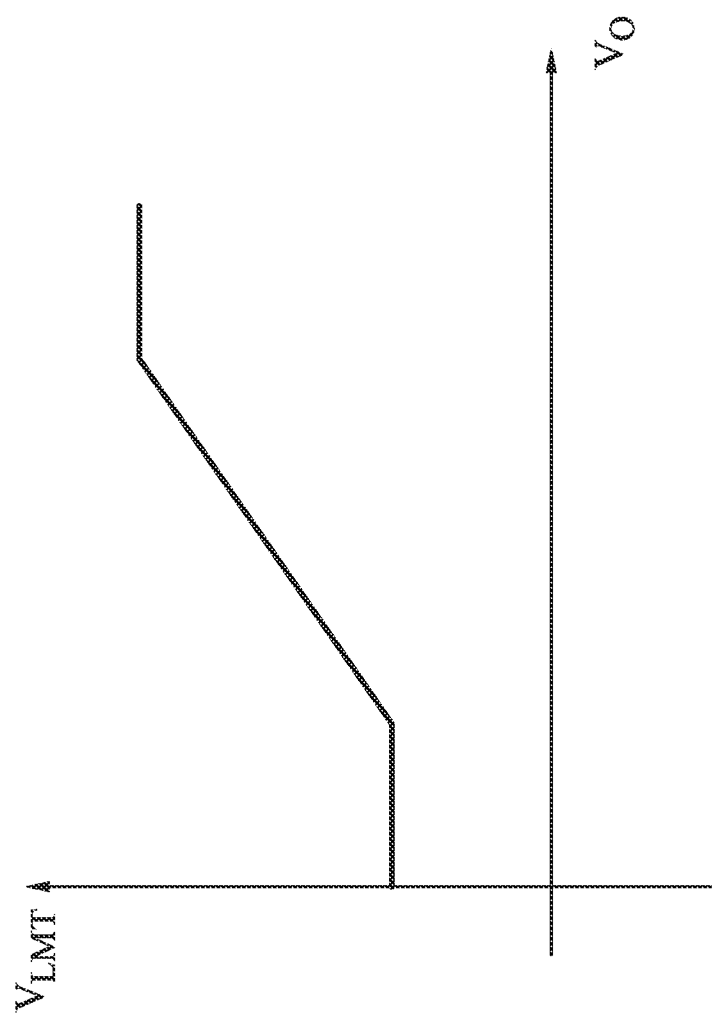
FIG. 5 shows a curve of a current-limit signal versus an output voltage of the power supply in FIG. 1.

FIG. 5 shows a curve of the current-limit signal $V_{LMT}$ versus the output voltage $V_O$ of the power supply. When the level of the output voltage $V_O$ is programmed to a higher value (e.g. 20V), the current-limit signal $V_{LMT}$ will be set to a higher value (e.g. 1V). If the level of the output voltage $V_O$ is programmed to be a lower voltage (e.g. 5V), then the current-limit signal $V_{LMT}$ will be automatically set as be lower level (e.g. 0.5V) to meet the safety requirement. As described in above, the current-limit signal $V_{LMT}$ represents the limit signal $I_X$. In other words, the level of the limit signal $I_X$ is decreased in response to the decrease of the level of the output voltage $V_O$.

Besides, when the level of the input voltage $V_{IN}$ is higher, the current-limit signal $V_{LMT}$ will be automatically adjusted to a lower value. In other words, the level of the limit signal $I_X$ is decreased in response to the increase of the level of the input voltage $V_{IN}$.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control circuit of a power supply comprising:

a sample-and-hold circuit coupled to the transformer for generating an input-voltage signal, wherein the input-voltage signal represents an input voltage of the power supply;

a circuit receiving the input-voltage signal and generating a limit signal in response to an output voltage of the power supply and the input-voltage signal for limiting a switching current of a transformer of the power supply; and a PWM circuit generating a switching signal in response to a feedback signal and the limit signal for switching the transformer and regulating the output voltage of the power supply, wherein a level of the feedback signal is related to a level of the output voltage of the power supply, and the output voltage of the power supply is programmable.

2. The control circuit as claimed in claim 1 further comprising:

a sample-and-hold circuit to sample a reflected voltage of the transformer for generating an output-voltage signal, wherein the output-voltage signal represents the output voltage of the power supply.

3. The control circuit as claimed in claim 1, wherein a level of the limit signal is decreased in response to decrease a level of the output voltage of the power supply.

4. The control circuit as claimed in claim 1, wherein the control circuit decreases a level of the limit signal when the input voltage is increased.

5. The control circuit as claimed in claim 1, wherein a level of the limit signal is increased during a power-on period of the power supply.

6. The control circuit as claimed in claim 1, wherein a level of the limit signal is increased during a period when the output voltage is programmed to a higher value.

7. A method of generating an output voltage of a power supply, comprising:

generating an input-voltage signal by sampling the reflected voltage of the transformer by a sample-and-hold circuit, wherein the input-voltage signal represents an input voltage of the power supply, generating a limit signal in response to an output voltage of the power supply and the input-voltage signal for limiting a switching current of a transformer of the power supply; and generating a switching signal in response to a feedback signal and the limit signal for switching the transformer and regulating the output voltage of the power supply, wherein a level of the feedback signal is related to the level of the output voltage of the power supply, and the output voltage of the power supply is programmable.

8. The method as claimed in claim 7 further comprising:

generating an output-voltage signal by sampling a reflected voltage of the transformer, wherein the output-voltage signal represents the output voltage of the power supply.

9. The method as claimed in claim 7, wherein a level of the limit signal is decreased in response to decrease a level of the output voltage of the power supply.

10. The method as claimed in claim 7, wherein a level of the limit signal is decreased when the input voltage is increased.

11. The method as claimed in claim 7, wherein a level of the limit signal is increased during a power-on period of the power supply.

12. The method as claimed in claim 7, wherein a level of the limit signal is increased during a period when the output voltage is programmed to a higher value.

* * * * *